United States Patent [19]
Walsh

[11] Patent Number: 5,281,966
[45] Date of Patent: Jan. 25, 1994

[54] METHOD OF ENCODING ALPHABETIC CHARACTERS FOR A CHORD KEYBOARD

[76] Inventor: A. Peter Walsh, 4545 N. Chelsea La., Bethesda, Md. 20814-4748

[21] Appl. No.: 830,337

[22] Filed: Jan. 31, 1992

[51] Int. Cl.$^5$ ............................................. G06F 3/023
[52] U.S. Cl. ......................................... 341/22; 400/100; 400/489; 341/23
[58] Field of Search ........................... 341/22, 23, 20; 400/91-94, 100, 482, 485, 486, 489; 364/709.12, 709.15, 709.16, 706, 189

[56] References Cited

U.S. PATENT DOCUMENTS

| | | | |
|---|---|---|---|
| 3,022,878 | 2/1962 | Seibel et al. | 341/20 |
| 4,074,444 | 2/1978 | Laenger, Sr. et al. | 341/21 |
| 4,211,497 | 7/1980 | Montgomery | 400/486 |
| 4,360,892 | 11/1982 | Endfield | 341/22 |
| 4,414,537 | 11/1983 | Grimes | 341/20 |
| 4,442,506 | 4/1984 | Endfield | 341/22 |
| 4,458,238 | 7/1984 | Learn | 340/711 |
| 4,655,621 | 4/1987 | Holden | 341/20 |
| 4,791,408 | 12/1988 | Heusinkveld | 364/189 |
| 4,849,732 | 7/1989 | Dolenc | 341/20 |
| 4,897,649 | 1/1990 | Stucki | 341/22 |
| 4,905,001 | 2/1990 | Penner | 341/20 |
| 4,927,279 | 5/1990 | Morgan | 400/486 |

FOREIGN PATENT DOCUMENTS 60-169923 9/1985 Japan ........................... 341/22

Primary Examiner—Donald J. Yusko
Assistant Examiner—Michael Horabik
Attorney, Agent, or Firm—Birch, Stewart, Kolasch & Birch

[57] ABSTRACT

A method of encoding alphabetic characters and inputting electrical signals defining those characters to a computer includes the use of a keyboard having five individual alpha input keys, one alpha input key being operatively associated with an operator's thumb and the remaining keys each being dedicated for operation by one finger of the operator's hand. The keys are actuable either individually or in chord combinations for encoding the alphabetic characters and inputting electrical signals to the computer. Each of the alpha input keys are designated to represent one of the five vowels. Therefore, when these keys are actuated individually they generate electrical signals corresponding to the vowels. The consonants of the alphabet are designated to correspond to chord combinations of key actuations. Unique electrical signals are generated in response to the actuation of one or more of the alpha keys to selectively input the electrical signals defining the alphabetic characters to the computer.

4 Claims, 1 Drawing Sheet

METHOD OF ENCODING ALPHABETIC CHARACTERS FOR A CHORD KEYBOARD

BACKGROUND OF THE INVENTION

The present invention relates to a method of encoding alphabetic characters for a chord keyboard. More specifically, the present invention relates to a method of encoding alphabetic characters for a chord keyboard and generating electrical signals identifying the alphabetic characters to a word processor or the like.

Chord keyboards are known in the art and generally include at least five character keys, one for the thumb and each of the four fingers of a single hand of an operator. These chord keyboards are designed so that keys may be actuated either individually or in chord combinations to selectively generate the 26 letters of the English alphabet. In order to make these chord keyboards practical, the codes or conventions for generating the alpha characters should be easy to learn and remember. Chord keyboards of the type described are disclosed in U.S. Pat. Nos. 4,443,789 and 4,360,892 to Endfield. Another example of such a keyboard is described in U.S. Pat. No. 4,791,408 to Heusinkveld.

Attempts have been made to simplify the encoding of a chord keyboard for ease of learning and memory. Endfield for example in the above-described patents discloses a visual method for facilitating ease of learning and memory whereby the various chord combinations of the alpha key actuations are intended to visually illustrate pictographs of the letters which the chords represent. While this method of learning the chord combinations may be a step in the right direction, it falls far short of providing a simple learning technique for the chords. Accordingly, a need in the art exists for an improved method for encoding the alphabetic characters of a chord keyboard which is learnable.

SUMMARY OF THE INVENTION

Accordingly, a primary object of the present invention is to provide an improved method for encoding the alphabetic characters of a chord keyboard which is learnable and usable.

It is a further object of the present invention to provide a method of encoding a chord keyboard which facilitates fast one-hand typing speed.

It is another object of the present invention to provide a method of encoding a chord keyboard which enables the keyboard per se to be miniaturized and ergonomically designed to free one hand and the need to sit while typing.

These and other objects of the present invention are fulfilled by providing a method of encoding alphabetic characters and inputting electrical signals defining those characters to a computer comprising the steps of: providing a keyboard having five individual alpha input keys, one alpha input key being operatively associated with an operator's thumb and the remaining keys each being dedicated for operation by one finger of the operator's hand, said keys being actuable either individually or in chord combinations for encoding said alphabetic characters and inputting said signals to the computer; designating each alpha input key to represent one of the five vowels "a", "e", "i", "o", "u" when actuated individually without actuation of any other alpha keys in combination therewith; designating combinations of alpha input keys to represent each consonant letter of the alphabet; and generating unique electrical signals in response to the actuation of one or more of said alpha keys to selectively input the electrical signals defining the alphabetic characters to the computer.

The majority of the chord combinations designated to represent a consonant in a preferred embodiment include an alpha input key designated to represent the last vowel preceding that consonant in alphabetical order.

Also in a preferred embodiment successive consonants moving in alphabetical order are defined by a chord combination which includes the addition of the next successive alpha key moving seriatim from the thumb to the little finger (pinky) of the typist's hand, whereby the sequential movement of the operator's fingers functions as a mnemonic to the typist for the chord combinations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF PREFERRED EMBODIMENTS

Figure 1:
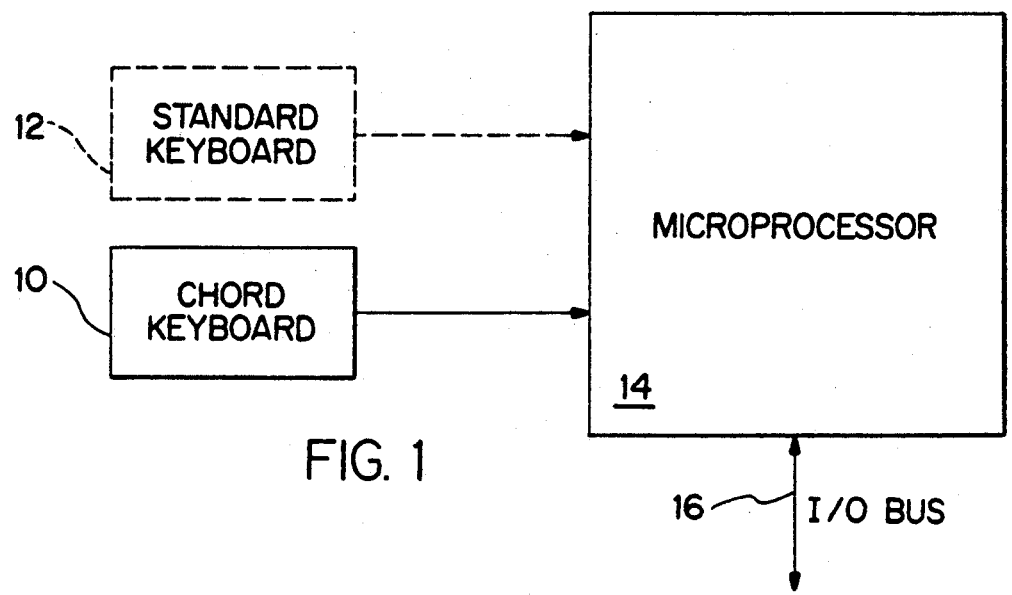
FIG. 1 is a schematic block diagram illustrating a chord keyboard and a standard keyboard coupled to a microprocessor in order to illustrate the hardware of the system in which the method of the present invention would be utilized.

Referring to FIG. 1 there is illustrated a chord keyboard 10 which could be of the type described in the aforementioned Endfield and Heusinkveld patents. The chord keyboard is utilized to generate alphabetic character signals and input the signals to a microprocessor 14 in response to individual or chord combination key actuations. The chord keyboard 10 may be used as a supplement to a standard keyboard 12 or it may be used in place of the standard keyboard 12 as desired. Microprocessor 14 would in most instances be part of a word processing system and would be coupled to peripheral components such as monitors and printers through an input/output bus 16.

Figure 2:
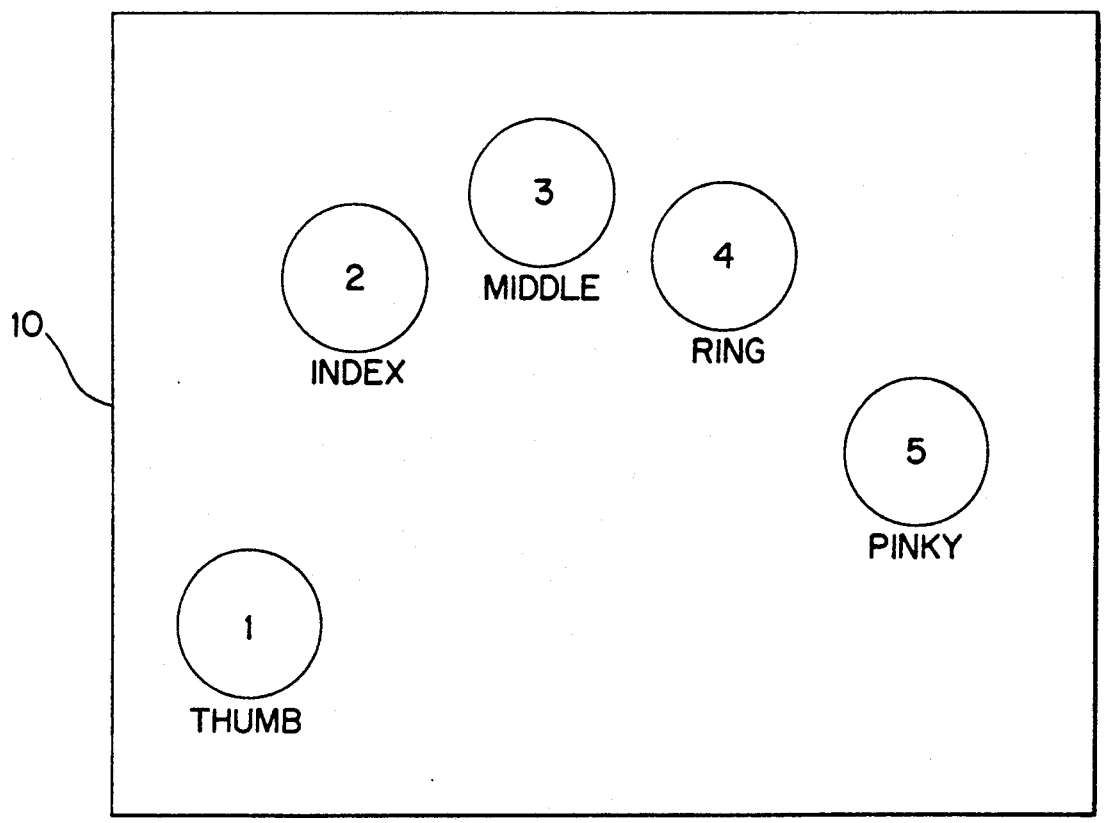
FIG. 2 is a top plan view of a one-handed, five key chord keyboard usable in the system of FIG. 1.

Referring to FIG. 2 there is illustrated in diagrammatic form a chord keyboard 10. The keyboard 10 includes 5 alpha input keys dedicated for actuation by the thumb, index, middle, ring and pinky fingers, respectively. For the other hand of the same user, the thumb is still the number 1 key and the rest of the fingers follow in succession in mirror image. For the purposes of explanation of the method of coding of the present invention these keys are numbered 1 to 5, respectively, so that the thumb is 1, the index finger is 2, the middle finger is 3, the ring finger is 4, and the pinky or little finger is 5.

The method of the present invention relates in part to Applicants discovery that if each of the individual keys of the chord keyboard 10 are designated to correspond, respectively, to the 5 vowels, "a", "e", "i", "o", "u" that the key associations with the vowels and in fact all associated consonants of the English alphabet are easier to remember. That is key "1" corresponds to the vowel "a"; key "2" corresponds to the vowel "e"; key "3" corresponds to the vowel "i"; key "4" corresponds to the vowel "o"; and key "5" corresponds to the vowel "u". This is easily and readily remembered because the five vowels correspond to each of the five fingers of the operator's hand. Therefore, the feel associated with respect to fingers of the hand, as they depress keys on a keyboard, actually assist in the memory of these conventions.

Another reason that it is advantageous to designate the five vowels as corresponding to the five alpha keys is that vowels of course are the most often used letters in the typing of words. Therefore, it is important to have a simple method of remembering the vowels, and to associate each vowel with one of the five keys provides this simplicity. Furthermore, actuation of the vowels is the simplest of any of the actuations because only a single key actuation is required for generating an electrical signal representative of a vowel.

Therefore, the designation of the vowels as corresponding to the respective five keys of the keyboard is an important aspect of the present invention and these vowels can be used as landmarks or roots for determining the chords (key actuation combinations) which represent the remaining consonants of the alphabet.

Applicant has discovered that a chord combination designated to represent a consonant is more easily learnable if an alpha input key designated to represent the last vowel preceding that consonant in alphabetical order is included in the chord combination. For example, referring to FIG. 2 if key "1" associated with the thumb is the vowel "a", consonants B, C, D are generated by chord combination key actuations as follows:

A = Key 1
B = Key 1 and Key 2
C = Key 1, Key 2, and Key 3
D = Key 1, Key 2, Key 3 and Key 4

Therefore it can be seen by referring to FIG. 2 that if one knows that key "1" is the vowel "a", and key "5" is the vowel "e", that the successive consonants B, C, D are learnable because they include key actuation combinations including the landmark or root vowel "a" (key 1). Furthermore, if one were to put one's thumb and forefingers on the keys of the chord keyboard of FIG. 2 and actuate key and the chords associated with letters B, C and D in sequence, one can feel the relationship associated with the rolling of the fingers from left to right on the keyboard. This feel is fed back to the typist's brain and is actually a learning aid to the typist for the coding and chord conventions of the keys.

It should also be noted with reference to FIG. 2 and the above-described example of the chords relating to consonants B, C, D that successive consonants moving in alphabetical order are defined by a chord combination which includes the addition of the next successive alpha key moving seriatim from the thumb to the little finger of the operator's hand. As described above this arrangement and the rolling motion of one's fingers from left to right functions as a mnemonic to the operator of the chord combinations.

There are 31 key actuation combinations available with a five key keyboard wherein single key actuations of each of the respective keys correspond to the five vowels. Utilizing the encoding techniques of the method of the present invention as described above the entire 26 letter English alphabet has been developed as follows wherein the numbers 1 to 5 to the right of each letter define the key actuation combinations of the respective chords, or in the case of the vowels, the number of the single key actuation required to generate an electrical signal corresponding to that vowel.

CHORD ALPHABET TABLE I

| | | |
|---|---|---|
| A | = | 1 |
| B | = | 1,2 |
| C | = | 1,2,3 |
| D | = | 1,2,3,4 |
| E | = | 2 |
| F | = | 2,3 |
| G | = | 2,3,4 |
| H | = | 2,3,4,5 |
| I | = | 3 |
| J | = | 3,4 |
| K | = | 3,4,5 |
| L | = | 1,3 |
| M | = | 1,3,4 |
| N | = | 1,3,4,5 |
| O | = | 4 |
| P | = | 1,4 |
| Q | = | 1,2,4 |
| R | = | 1,2,4,5 |
| S | = | 2,4,5 |
| T | = | 4,5 |
| U | = | 5 |
| V | = | 1,5 |
| W | = | 1,2,5 |
| X | = | 1,2,3,5 |
| Y | = | 2,3,5 |
| Z | = | 3,5 |

Referring to the above table, key actuation combinations 2,4 and 3,5 are still available and these combinations could be utilized to generate a period and a comma. The 1, 2, 3, 4, 5 combination is reserved for a carriage return.

Referring again to the above table of conventions it can be seen that the letters A-K are readily generated by the above-described method and therefore easily remembered and it is not until one reaches the letter L that the mnemonic becomes more difficult. However, even at this point it can be seen that successive consonants M and N and so on build on the preceding adjacent combinations so that the feel from the typist's hand functions as a mnemonic as well as using vowels as root chords.

In summary the encoding method of the present invention enables relatively fast typing speeds for a one-handed, five key keyboard which is easy to use, learn and memorize.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of encoding alphabetic characteristics and inputting electrical signals defining those characters to a computer comprising the steps of:
   a) providing a keyboard having five adjacent individual alpha input keys, one alpha input key being operatively associated with an operator's thumb and the remaining keys each being dedicated for operation by one finger of the operator's hand, said keys being actuable either individually or in chord combinations for encoding said alphabetic characters and inputting said signals to the computer;

b) designating each alpha input key to represent one of the five vowels "a", "e", "i", "o", "u" when actuated individually without actuation of any other alpha keys in combination therewith, the designation of the alpha input keys being such that in an operative position of the operator's hand the thumb activates the "a" or first key, the index finger actuates the "e" or second key, the middle finger activates the "i" or third key, the ring finger activates the "o" or fourth key and the pinky activates the "u" or fifth key;

c) designating chord combinations of the same five alpha input keys to represent each consonant letter of the alphabet, said chord combinations designated to represent a consonant including an alpha input key representing the last vowel preceding that consonant in alphabetical order, successive consonants moving in alphabetical order being defined by a chord combination which includes the addition of the next successive alpha key moving seriatim from the thumb to the little finger of the operator's hand, whereby the sequential movement of the operator's fingers functions as a memory aid to the operator of the chord combinations; and d) generating unique electrical signals in response to the actuation of one or more of said alpha keys to selectively input the electrical signals defining the alphabetic characters to the computer.

2. A method of inputting electrical signals relating to alphabetic character data to a computer comprising the steps of:

a) providing a keyboard having five individual alpha input keys, one alpha input key being operatively associated with an operator's thumb and the remaining keys each being dedicated for operation by one finger of the operator's hand, said keys being actuable either individually or in chord combinations for encoding said alphabetic characters and inputting said signals to the computer;

b) designating each alpha input key to represent one of the five vowels "a", "e", "i", "o", "u" when actuated individually without actuation of any other alpha keys in combination therewith, the designation of the alpha input keys being such that in an operative position of the operator's hand the thumb activates the "a" or first key, the index finger actuates the "e" or second key, the middle finger activates the "i" or third key, the ring finger activates the "o" or fourth key and the pinky activates the "u" or fifth key;

c) designating cord combinations of the same five alpha input keys to represent each consonant letter of the alphabet, said chord combinations designated to represent a consonant including an alpha input key representing the last vowel preceding that consonant in alphabetical order, successive consonants moving in alphabetical order being defined by a chord combination which includes the addition of the next successive alpha key moving seriatim from the thumb to the little finger of the operator's hand, whereby the sequential movement of the operator's fingers functions as a memory aid to the operator of the chord combinations; and d) generating unique electrical signals in response to the actuation of one or more of said alpha keys to selectively input the electrical signals defining the alphabetic characters to the word processor.

3. A method of defining alphabetic characters for a chord keyboard comprising the steps of:

a) providing a keyboard having five individual alpha input keys, one alpha input key being operatively associated with an operator's thumb and the remaining keys each being dedicated for operation by one finger of the operator's hand, said keys being actuable either individually or in chord combinations for encoding said alphabetic characters and inputting said signals to a computer;

b) designating each alpha input key to represent one of the five vowels "a", "e", "i", "o", "u" when actuated individually without actuation of any other alpha keys in combination therewith, the designation of the alpha input keys being such that in an operative position of the operator's hand the thumb activates the "a" or first key, the index finger actuates the "e" or second key, the middle finger activates the "i" or third key, the ring finger activates the "o" or fourth key and the pinky activates the "u" or fifth key;

c) designating chord combinations of the same five alpha input keys to represent each consonant letter of the alphabet, said chord combinations designated to represent a consonant including an alpha input key representing the last vowel preceding that consonant in alphabetical order, successive consonants moving in alphabetical order being defined by a chord combination which includes the addition of the next successive alpha key moving seriatim from the thumb to the little finger of the operator's hand, whereby the sequential movement of the operator's fingers functions as a memory aid to the operator of the chord combinations; and d) generating unique electrical signals in response to the actuation of one or more of said alpha keys to selectively input the electrical signals defining the alphabetic characters to a computer.

4. A method of defining alphabetic characters for a chord keyboard comprising the steps of:

a) providing a keyboard having five individual alpha input keys, one alpha input key being operatively associated with an operator's thumb and the remaining keys each being dedicated for operation by one finger of the operator's hand, said keys being actuable either individually or in chord combinations for encoding said alphabetic characters and inputting said signals to a computer, the keys being numbered "1" for the thumb, "2" for the index finger, "3" for the middle finger, "4" for the ring finger and "5" for the pinky;

b) designating each alpha input key to represent one of the five vowels "a", "e", "i", "o", "u" when actuated individually without actuation of any other alpha keys in combination therewith, the designation of the alpha input keys being such that in an operative position of the operator's hand the thumb activates the "a" or first key, the index finger actuates the "e" or second key, the middle finger activates the "i" or third key, the ring finger activates the "o" or fourth key and the pinky activates the "u" or fifth key and designating chord combinations of alpha input keys to represent each consonant letter of the alphabet, whereby electrical signals defining letters A to K are generated by individual or combined actuation of said keys "1" to "5" as follows,

A=1
B=1,2
C=1,2,3
D=1,2,3,4
E=2
F=2,3
G=2,3,4
H=2,3,4,5
I=3
J=3,4
K=3,4,5 c) designating individual or combined actuations of keys "1" to "5" to represent the remaining letters of the alphabet as follows:

L=1,3
M=1,3,4
N=1,3,4,5
O=4
P=1,4
Q=1,2,4
R=1,2,4,5
S=2,4,5
T=4,5
U=5
V=1,5
W=1,2,5
X=1,2,3,5
Y=2,3,5
Z=3,5;

and d) generating unique electrical signals in response to the foregoing individual or combined actuations of said alpha keys to selectively input the electrical signals defining the alphabetic characters to a computer.

* * * * *